ent Office 3,095,205
Patented June 25, 1963

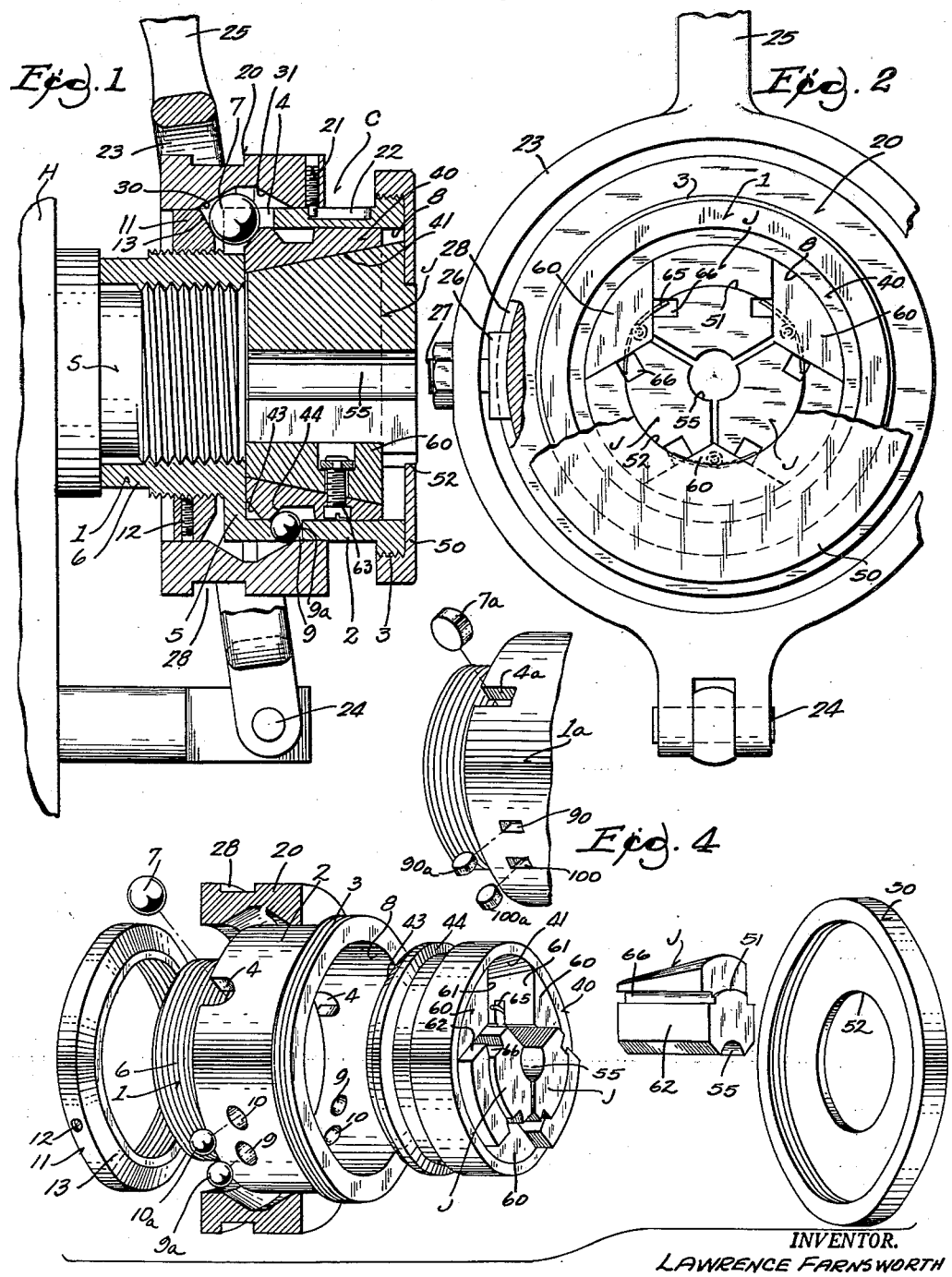

3,095,205
CHUCK
Lawrence Farnsworth, Racine, Wis., assignor of one-half to Max M. Seft, Racine, Wis.
Filed July 28, 1961, Ser. No. 127,630
7 Claims. (Cl. 279—74)

The present invention relates to workpiece holding devices, such as collet chucks or indexing or holding fixtures and finds particular but not exclusive utility for use with milling machines, drill presses, or lathes.

The invention relates to that type of chucks which have a body and a collet actuating sleeve or closer axially shiftable in the body. These conventional chucks also utilize an actuating collar for forcibly shifting the closer in either axial direction, that is, in a collet closing or opening direction. More particularly, the present invention relates to an improved means functionally located between the closer and actuating collar for transmitting axial shifting forces therebetween.

Conventional collet chucks of the above type have met with considerable success as far as their intended functions are concerned. However, because of the numerous parts of various complex forms requiring numerous and costly machining operations for their manufacture, the cost of these chucks has been considerable.

According to the present invention, a chuck of the above general type has been provided which is comparatively simple both to manufacture and in construction, which has resulted in a chuck capable of being produced more economically. In addition, and importantly, the improved chuck has resulted in higher gripping pressure and with less operating forces and effort required.

A more specific aspect of the present invention is to provide a chuck of the above type in which a plurality of individual members which have a round cross-sectional shape are used as the intermediate, force transmitting medium between the actuating collar and the collet closer. These members may take the form of short cylindrical, roller-type bearings or ball bearings, preferably of hardened steel. These round in cross-section members provide exceptionally good holding power of the chuck and provide only point contact between the parts, resulting in low operating frictional forces therebetween. At the same time, however, these round members are capable of transmitting high operating pressures between the operating parts.

Another aspect of the invention furthermore contemplates the use of such round members for also positively unlocking or disengaging the closer from the gripping jaws of the collet or similar gripping device. By providing a positive and forciful unlocking arrangement, a smaller taper can be used between the closer and the gripping jaws which results, in itself, in greater gripping pressures.

Another object of the invention is to provide an improved closer and gripper jaws combination which eliminates the necessity of a collet, as such. This aspect of the present invention provides a series of separate gripper jaws which each have an external tapered surface engageable by a complementary internal surface of the closer. The individual and completely separate jaws are loosely held in assembled relationship within the closer by means of spacers or guides loosely fastened in the closer, one spacer being located between each pair of adjacent jaws. The arrangement is such that the jaws are held in loosely assembled relationship within and slidable relative to the closer; as the closer is axially shifted over the jaws, the latter are held in an axial direction by an associated nosepiece against which they abut, and consequently the closer urges the jaws radially inwardly into gripping relationship with the workpiece located centrally between the jaws.

The mounting of and relationship between the jaws and their spacers permits the individual jaws to be radially moved together and perfectly concentrically in regard to the chuck and the workpiece.

These and other objects and advantages will appear hereinafter as this disclosure progresses, reference being had to the accompanying drawings, in which:

FIGURE 1 is an elevational, cross sectional view taken axially along a chuck made in accordance with the present invention;

FIGURE 2 is a front elevational view of the chuck shown in FIGURE 1 but with parts shown as being broken away or removed;

FIGURE 3 is an exploded, perspective view of the chuck, but on a reduced scale, and with certain parts shown as broken away, and FIGURE 4 is a fragmentary, perspective view of a modified form of the invention.

The invention will be shown and described as used with a rotatably driven spindle such as is employed on a lathe, but the present chuck also finds utility when stationary, that is, nonrotatably mounted, such as on a fixed mounting post of a drill press.

Referring in greater detail to the drawings, wherein one application of the invention has been shown, a rotatable spindle S is journaled in and extends from the housing H of a machine, such as a lathe, drill press, milling machine, or the like. The spindle may be tubular so that the workpiece (not shown) can take the form of barstock which passes through the spindle and has a free end that extends from the chuck C, in the well-known manner.

The invention will first be described in connection with FIGURES 1, 2, and 3 wherein the force transmitting elements are shown as balls. However, the relative arrangement of parts and their functions are the same when the short cylindrical elements shown in FIGURE 4 are used.

*The Chuck Body*

The body 1 of the chuck is threaded on and thereby removably secured to the free end of the spindle. The body is generally tubular in shape and has an enlarged front end 2 which terminates in an externally threaded end 3.

Openings 4 are provided through the cylindrical wall of the body at three circumferentially spaced locations and also extend through the shoulder 5 which is formed between the enlarged front end 2 of the body and the smaller end 6. These openings are for the purpose of each containing an opening ball 7. It will be noted that the size of these balls is such that they extend outwardly beyond the periphery of the body and also extend inwardly and into the large bore 8 in the enlarged end 2 of the tubular body.

The body also has three pairs of circumferentially spaced, smaller openings 9 and 10 extending through its wall, the openings 9 of each pair being axially spaced from the opening 10 of each pair. A smaller ball 9a and 10a, respectively, is located in each of the openings 9 and 10, and will be referred to as the closing balls.

The balls 9a serve the same purpose as do the balls 10a, but are effective in sequence therewith to urge the closer C in an axial direction, as will more fully appear.

The balls are all of hardened steel and relatively inexpensive, being of the ball bearing type. They are mounted in the body in their respective openings or holes for radial shifting movement relative to the body.

*Pressure Adjusting Ring*

The smaller end 6 of the body also has an external threaded portion on which an adjusting ring 11 is threadably engaged. A set screw 12 extends through the ring for engagement with the body to hold the ring in any one of its selected positions along the axial length of the threaded portion. This adjusting ring is for the purpose of adjusting the gripping pressure of the jaws, to be described. It will be noted that the ring has a conical cam surface 13 which is inclined outwardly and rearwardly. The external diameter of the ring coincides generally with the outer diameter of the enlarged end 2 of the body.

Actuating Collar

An actuating collar 20 is axially slidable on the enlarged end 2 of the body and on the ring 11 and the limits of this axial movement are determined by the pin 21 threadably extending through the collar and terminating in the axial slot 22 in the body.

The collar is axially shiftable in either direction, in the well-known manner, by the yoke 23 which is pivotally mounted to the machine housing, as at 24 and which has an upstanding and manually operable handle 25. The yoke has a pair of diametrically opposite sliders 26 (only one shown) pivotally secured thereto by bolt means 27. These sliders are mounted in the annular groove 28 formed around the periphery of the collar. The collar rotates with the rest of the chuck and relative to the sliders and yoke.

The collar is shown in FIGURE 1 in the collet open position wherein it has been shifted to the rear (to the left) of the chuck by swinging the yoke handle to the left, or rearwardly.

Formed internally around the collar is an inclined or conical cam surface 30 which functions as a collet closing surface, as will appear. A similar but oppositely facing cam surface 31 is also formed around the interior of the collar and is axially spaced from surface 30. Surface 31 functions as a collet opening surface.

Closer

A collet closer 40 of generally tubular form is slidably mounted in the bore 8 of the body for axial shifting relative thereto between a collet open position, shown in FIGURE 1, and a collet closed position to the right. This closer has an internally tapered surface 41 which is complementary to and engages the external taper of the gripping jaws J, to be described later.

The closer also has a pair of oppositely disposed, conical cam or inclined surfaces 43 and 44. The inclined surface 43 is the collet closing surface and surface 44 is the collet opening surface.

The annular, external cam closing surface 43 is engaged by the closing balls 7, and thus when the balls 7 are urged radially inwardly between cam surfaces 13 and this surface 43, by pressure of inclined surface 30 of the collar, the closer is urged axially to the right to the collet closing position.

Point contact is established between the balls 7 and the cam surfaces 30, 13, and 43, thereby reducing frictional forces to a minimum. On the other hand, considerable pressure can be exerted between the parts by means of these hardened steel balls.

The cam surface 44 of the closer is engaged by the smaller balls 9a and 10a in order to forcibly shift the closer to the open (left) position. More specifically, cam surface 31 of the collar first acts on the three, circumferentially spaced balls 10a to urge them radially inwardly against surface 44, thereby shifting the closer a distance to the left, that is, toward the collet open position. Additional travel to the left is imparted to the closer when the collar cam surface 31 next contacts balls 9a which then act on the closer cam surface 44 to urge the closer an additional and final amount to the left. Thus, the axially spaced balls 9a and 10a act successively on the closer to shift it axially to the collet open position. The movement imparted by only one set of small balls 9a may not be sufficient to fully retract the closer, and therefore a second set of balls 10a, axially spaced from the first set 9a, are used to impart the second and final phase of travel to the closer in the opening or jaw-release direction.

Figure 4 Modification

Referring now to FIGURE 4, the body 1a is the same as the body 1 of the FIGURE 1 device, except that the openings 4a are formed to receive their respective cylinders 7a and prevent the latter from tilting or wobbling. Similarly, the openings 90 and 100 are formed generally as rectangles so their respective cylinders 90a and 100a guidingly fit therein without twisting about their axis of rotation.

These cylinders act with point contact against the conical cam surfaces of the collar 20 and closer 40 and function in the same manner as the balls. These cylinders or roller bearings may also be of hardened steel and are relatively inexpensive.

Gripper Jaws

Three separate and individual gripper jaws J are mounted in the closer and as previously mentioned have an external taper which complements the internal taper of the closer. The angle of this taper may be on the order of only eleven degrees, which is comparatively small for collet jaws. The use of such a small taper is made possible with the positively unlocking closer, and contributes to the exceptional gripping pressure possible with the present chuck.

At their front ends, the jaws J each abut against the nose piece 50 which is threaded onto the external threaded portion 3 of the body, and are held thereby against forward axial movement. An arcuate shoulder 51 is turned on the front side of each jaw and protrudes into the central opening 52 of the nose piece.

Generally, the jaws do not shift axially in the chuck but instead move only in a radial direction. The jaws are moved radially inwardly to grip the workpiece due to axial shifting of the closer to the right (FIGURE 1), into tight engagement of the complementary tapered surfaces.

The bore 55 defined by the internal surface of the gripper jaws is made in the jaws while they are all rigidly held together and is of a size closely approximating the diameter of the workpiece to be gripped thereby. In this manner, accurate holding by the jaws is possible, and only very slight axial shifting of the closer and radial movement of the jaws are necessary to open or close the jaws.

Also mounted within the closer and located between adjacent jaws are spacers 60 which act as guides for the jaws and have sides 61 which are parallel to the jaw sides 62. The spacers are rather loosely held in the closer by means of their respective bolts 63 which extend loosely through the closer wall and spacer. The jaws, in turn, are held in rather loosely assembled relationship within the closer by the springs 65 mounted in the spacers and having their free ends extending into the grooves 66 formed in opposite sides of the jaws.

Thus, the jaws are free to move radially and are able to adapt themselves concentrically and align themselves accurately in gripping relationship to the workpiece.

Résumé

The pressure transmitting, round elements establish only point contact between the parts, thereby minimizing frictional resistance to operation of the actuating ring and closer. At the same time, these elements are capable of transmitting high forces between the parts.

The chuck provided by the present invention is relatively simple and economical to manufacture, and also relatively free of pressure levers, bell cranks, and other complex and numerous parts.

The adjusting ring provides a convenient and accurate means for varying the gripping pressure exerted by the elements by varying the axial travel imparted to the closer by radial movement of the closing elements.

By providing a positive jaw unlocking means for shifting the closer to the open position, a small taper is required between the closer and jaws, resulting in a more smoothly operating chuck with higher gripping pressures.

With the improved gripping jaws and closure assembly, the jaw inserts, which are individual and separate pieces from one another, are easily replaced with other sets defining a different size gripping bore. These jaws or jaw inserts can be economically made in accordance with the workpiece to be held. In other words, for production runs, for example, the gripping bore of the jaws is made approximately the same as the diameter of the stock to be worked. This insures good gripping pressure and accurate holding of the piece and results in positive locking and unlocking of the jaws. In addition, these jaws, which may be of the "soft type," are inexpensive and can be rebored to a larger gripping size and used over again on larger diameter pieces. Thus, a conventional collet need not be used with the present invention, although a conventional collet on the other hand may, if desired, be utilized with the improved chuck.

The jaws are loosely held in the closer but are also accurately guided by the loosely mounted spacers so that the jaws can adapt themselves accurately in embracing and gripping the workpiece. As the jaws move radially inwardly around the workpiece, the bore defined by the jaws is precisely arranged concentrically around the workpiece for accurate and positive gripping thereof.

Various modes of carrying out the invention are contemplated as being within the scope of the following claims particularly pointing out and distinctly claiming the subject matter which is regarded as the invention.

I claim:

1. A collet chuck for use with a machine tool having a spindle including a free end, said chuck comprising a tubular body adapted to be removably secured to said free end, a tubular collet closer axially slidable within said body between collet closed and collet open positions, gripper jaws in said closer and actuated thereby, said closer having an inclined closing surface, an actuating collar slidably mounted around said body for axial sliding relative thereto and also having an inclined closing surface, a plurality of circumferentially spaced balls carried by and shiftable relative to said body and located between and abuttable against said closing surfaces, an adjusting ring threadably engaged on said body for axial adjustment therealong and having a conical cam surface adjacent to but oppositely facing the inclined closing surface of said closer and engageable by said balls, and means for axially shifting said collar to thereby cause its closing surface to radially shift said balls inwardly between the closing surface of said closer and said cam surface to consequently axially shift the closer away from said cam surface and to a closed position.

2. A workpiece gripping closer assembly for a chuck comprising, a tubular closer having an internal taper, a plurality of individual spacers rather loosely mounted on said internal taper of said closer and circumferentially spaced apart from one another, and a plurality of separate and individual gripper jaws mounted in said closer and having an external taper complementing the closer taper, one jaw located between each adjacent pair of spacers for being slidingly guided thereby for movement in a radial direction.

3. A workpiece gripping closer assembly for a chuck comprising, a tubular closer having an internal taper, a plurality of individual spacers loosely mounted on said internal taper of said closer and circumferentially spaced apart from one another, said spacers having two straight sides which in part define a generally triangular cross sectional shape of said spacers, and a plurality of separate and individual gripper jaws mounted in said closer and having an external taper complementary to the closer taper, said jaws each having a pair of parallel sides, one jaw located between each adjacent pair of spacers and the abutting sides of the jaws and spacers being parallel whereby the jaws are slidingly guided by the spacers for movement in a radial direction.

4. In a chuck of the type having a body with a front end from which the workpiece protrudes and a tubular closer slidable within said body and having an internal taper, the combination of a nose piece on said front end and having a radially inwardly extending flange, a plurality of individual spacers mounted on said internal taper of said tubular closer and circumferentially spaced apart from one another, and a plurality of separate and individual gripper jaws insertable in said closer and having an external taper complementing the closer taper, said jaws having front ends which abut against said flange and are thereby held against axial displacement in one direction, one jaw located between each adjacent pair of spacers for being slidingly guided thereby for movement in a radial direction.

5. A workpiece gripping closer assembly for a chuck comprising, a tubular closer having an internal taper, a plurality of individual spacers rather loosely mounted on said internal taper of said tubular closer and circumferentially spaced apart from one another, a plurality of separate and individual gripper jaws mounted in said closer and having an external taper complementing the closer taper, one jaw located between each adjacent pair of spacers for being slidingly guided thereby for movement in a radial direction, and means carried by said spacers and extending therefrom for engagement with the adjacent jaws for loosely retaining the latter in said closer but permitting radial movement therein.

6. A collet chuck form use with a machine tool having a spindle including a free end, said chuck comprising a tubular body adapted to be removably secured to said free end, a tubular collet closer axially slidable within said body between collet closed and collet open positions, gripper jaws in said closer and actuated thereby, said closer having an inclined closing surface, a plurality of individual spacers mounted on said inclined closing surface and circumferentially spaced apart from one another, a plurality of separate and individual gripper jaws mounted in said closer and having an external taper complementing the closer taper, one jaw located between each adjacent pair of spacers for being slidingly guided thereby for movement in a radial direction, an actuating collar mounted around said body for axial sliding relative thereto and also having an inclined closing surface, a plurality of circumferentially spaced balls carried by and shiftable relative to said body and located between said closing surfaces for abutting thereagainst, and means for axially shifting said collar to thereby cause its closing surface to shift said balls against the inclined closing surface of said closer and consequently axially shift the latter to its closed position.

7. A collet chuck for use with a machine tool having a spindle including a free end, said chuck comprising a tubular body adapted to be removably secured to said free end, a tubular collet closer axially slidable within said body between collet closed and collet open positions, gripper jaws in said closer and actuated thereby, said closer having an inclined closing surface, a plurality of individual spacers mounted on said inclined closing surface and circumferentially spaced apart from one another, a plurality of separate and individual gripper jaws mounted in said closer and having an external taper complementing the closer taper, one jaw located between each adjacent pair of spacers for being slidingly guided thereby for movement in a radial direction, an actuating collar mounted around said body for axial sliding relative thereto and also having an inclined closing surface, a plurality of circumferentially spaced balls carried by and shiftable relative to said body and located between said closing surfaces for abutting thereagainst, an adjusting ring threadably engaged on said body for axial adjustment therealong and having a conical cam surface adjacent to but oppositely facing the inclined closing surface of said closer, and means for axially shifting said collar to thereby cause its closing surface to shift said balls against the inclined closing surface of said closer and consequently axially shift the latter to its closed position.

References Cited in the file of this patent

UNITED STATES PATENTS

| | | |
|---|---|---|
| 2,463,292 | McCallion | Mar. 1, 1949 |
| 2,464,625 | Warner | Mar. 15, 1949 |
| 2,735,686 | Cox | Feb. 21, 1956 |

FOREIGN PATENTS

| | | |
|---|---|---|
| 139,858 | Australia | Jan. 5, 1951 |